(12) United States Patent
Eyb

(10) Patent No.: US 12,031,517 B2
(45) Date of Patent: Jul. 9, 2024

(54) ROTOR BLADE COMPONENT, METHOD OF MANUFACTURING A ROTOR BLADE COMPONENT, AND A WIND ENERGY INSTALLATION

(71) Applicant: Siemens Gamesa Renewable Energy Service GmbH, Hamburg (DE)

(72) Inventor: Enno Eyb, Kiel (DE)

(73) Assignee: Siemens Gamesa Renewable Energy Service GmbH, Hamburg (DE)

(*) Notice: Subject to any disclaimer, the term of this patent is extended or adjusted under 35 U.S.C. 154(b) by 40 days.

(21) Appl. No.: 17/298,385

(22) PCT Filed: Nov. 25, 2019

(86) PCT No.: PCT/EP2019/082397
§ 371 (c)(1),
(2) Date: May 28, 2021

(87) PCT Pub. No.: WO2020/109218
PCT Pub. Date: Jun. 4, 2020

(65) Prior Publication Data
US 2022/0112880 A1 Apr. 14, 2022

(30) Foreign Application Priority Data
Nov. 28, 2018 (DE) .................... 10 2018 009 338.8

(51) Int. Cl.
*F03D 1/06* (2006.01)
*B29C 65/00* (2006.01)
*B29D 99/00* (2010.01)
*F03D 13/10* (2016.01)
*B29L 31/08* (2006.01)

(52) U.S. Cl.
CPC ........ *F03D 1/0675* (2013.01); *B29C 66/0224* (2013.01); *B29C 66/122* (2013.01);
(Continued)

(58) Field of Classification Search
CPC .................. F03D 1/0675; F03D 13/10; F05B 2280/5001; F05B 2280/6013;
(Continued)

(56) References Cited

U.S. PATENT DOCUMENTS 11,092,132 B2 * 8/2021 Quiring ................. B29C 70/342
11,759,894 B2 * 9/2023 Henrichsen ........... F03D 1/0675
29/889.71

(Continued)

FOREIGN PATENT DOCUMENTS

CN 103817955 A 5/2014
DE 102009047570 A1 6/2011
(Continued)

OTHER PUBLICATIONS

European Patent Office; Search Report in related International Patent Application No. PCT/EP2019/082397 dated Feb. 14, 2020; 5 pages.
(Continued)

*Primary Examiner* — Sang K Kim
(74) *Attorney, Agent, or Firm* — Dorton & Willis, LLP

(57) ABSTRACT

A method of manufacturing a rotor blade component for a rotor blade of a wind energy installation, a rotor blade component, and a wind energy installation comprising such a rotor blade component. The method includes manufacturing a layer system including a first layer of a first material and a second layer of a second material. The second material has a smaller modulus of elasticity than the first material, and the second layer extends at least partially along the first layer. The layer system is beveled at least at one end with the aid of at least one separation process such that the second layer projects beyond the first layer at the at least one end of
(Continued)

the layer system. The layer system is connected to at least one other such layer system so as to form the rotor blade component.

17 Claims, 3 Drawing Sheets

(52) U.S. Cl.
CPC ........ *B29C 66/636* (2013.01); *B29C 66/7315* (2013.01); *B29D 99/0025* (2013.01); *F03D 13/10* (2016.05); *B29L 2031/085* (2013.01); *F05B 2280/50* (2013.01); *F05B 2280/6003* (2013.01)

(58) Field of Classification Search
CPC ............ B29D 99/0025; B29C 66/0224; B29C 66/122; B29C 66/8636; B29C 66/7315; B29L 2031/08
See application file for complete search history.

(56) References Cited

U.S. PATENT DOCUMENTS

| | | | |
|---|---|---|---|
| 2011/0135486 A1 | 6/2011 | Bendel | |
| 2011/0142662 A1 | 6/2011 | Fritz et al. | |
| 2014/0271217 A1* | 9/2014 | Baker | F03D 1/0683 416/226 |
| 2018/0156202 A1* | 6/2018 | Lipka | F03D 80/30 |
| 2021/0404443 A1* | 12/2021 | Thwaites | F03D 80/30 |

FOREIGN PATENT DOCUMENTS

| | | | | |
|---|---|---|---|---|
| DE | 102011054871 A1 | 5/2012 | | |
| DE | 102016101663 A1 | 8/2017 | | |
| DE | 102016009640 A1 | 2/2018 | | |
| EP | 2239461 A2 | 10/2010 | | |
| EP | 2778393 A2 | 9/2014 | | |
| EP | 3026259 A1 | 6/2016 | | |
| EP | 3726049 A1 * | 10/2020 | ........... | F03D 1/0675 |

OTHER PUBLICATIONS

European Patent Office; Written Opinion in related International Patent Application No. PCT/EP2019/082397 dated Feb. 14, 2020; 8 pages.
German Patent Office; Search Report in related German Patent Application No. 10 2018 009 338.8 dated Sep. 30, 2019; 10 pages.
Chinese Patent Office; Search Report in related Chinese Patent Application No. 201980076021.2 dated Jul. 26, 2022; 7 pages.
European Patent Office; Examination Report in related International Patent Application No. EP 19 809 451.8 dated Jul. 26, 2023; 6 pages.

* cited by examiner

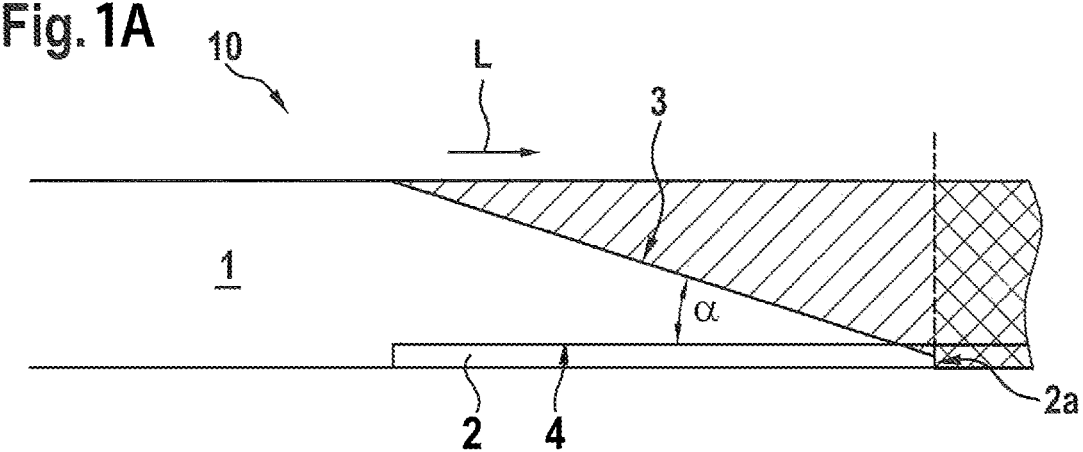

ROTOR BLADE COMPONENT, METHOD OF MANUFACTURING A ROTOR BLADE COMPONENT, AND A WIND ENERGY INSTALLATION

CROSS-REFERENCE TO RELATED APPLICATIONS

This application is a national phase application under 35 U.S.C. § 371 of International Patent Application No. PCT/EP2019/082397, filed Nov. 25, 2019 (pending), which claims the benefit of priority to German Patent Application No. DE 10 2018 009 338.8, filed Nov. 28, 2018, the disclosures of which are incorporated by reference herein in their entirety.

TECHNICAL FIELD

The present invention relates to a method of manufacturing a rotor blade component, in particular a rotor blade spar cap, for a rotor blade of a wind energy installation, to a rotor blade component, as well as to a wind energy installation comprising such a rotor blade component.

BACKGROUND

Rotor blades for wind energy installations are often assembled from two rotor blade shells which are manufactured separately. In this context, one or more spar caps can be provided in the interior of the rotor blade, which spar caps run substantially along a longitudinal axis of the rotor blade from the rotor blade root to the rotor blade tip and which provide additional robustness, or which have an impact on the elastic properties of the rotor blade.

In general, such spar caps are manufactured using pultrusion processes, in which, for example, individual pultruded layers of a fiber material, e. g. carbon fiber, are layered and bonded together to form the spar cap. In order to reduce the risk of the end of a layer detaching from the layer located underneath, it is known to bevel the ends of the layers, e. g. by milling, grinding or sawing, and thus to reduce the thickness at the end of the layer and thus to ensure a continuous flow of force between the terminating layer and the layer located underneath. For technical reasons, however, it is difficult, in this context, to reduce the thickness at the end of the layer to zero in the course of the beveling. This means that a residual thickness remains, which is why, in general, there is also a residual risk of detachment.

SUMMARY

It is an object of the present invention to provide an improved rotor blade component, and in particular to increase the load capacity of a rotor blade component.

This object is solved by a method of manufacturing a rotor blade component, by a rotor blade component, as well as by a wind energy installation in accordance with the present disclosure.

According to a first aspect of the invention, in a method of manufacturing a rotor blade component, in particular a rotor blade spar cap, for a rotor blade of a wind energy installation, a layer system comprising a first layer of a first material and a second layer of a second material is manufactured. In this context, the second material has a smaller modulus of elasticity than the first material, and the second layer extends at least partially along the first layer. The layer system is beveled at least at one end with the aid of at least one separation process in such a way that the second layer projects beyond the first layer at the at least one end of the layer system. In addition, the layer system is connected to at least one further such layer system so as to form the rotor blade component.

According to a second aspect of the invention, a rotor blade component, in particular a rotor blade spar cap, for a rotor blade of a wind energy installation, preferably a rotor blade component, in particular a rotor blade spar cap, which has been produced by the method according to the first aspect of the invention, comprises at least one layer system comprising a first layer of a first material and a second layer of a second material. In this context, the second layer is at least partially applied to the first layer, and the second material has a smaller modulus of elasticity than the first material. In addition, the layer system is beveled at least at one end in such a way that the second layer projects beyond the first layer at the at least one end of the layer system. The rotor blade component further comprises at least one further such layer system to which the at least one layer system is connected so as to form the rotor blade component.

According to a third aspect of the invention, a wind energy installation comprises at least one rotor blade which comprises a rotor blade component which has been manufactured using the method according to the first aspect of the invention and/or which comprises a rotor blade component according to the second aspect of the invention.

Preferably, such layer systems are connected to one another in such a way that the second layer of a first layer system, in the region of its at least one beveled end, rests on the first layer of a second layer system, in particular in such a way that the second layer of a first layer system, in the region of its at least one beveled end, rests completely on the first layer of a second layer system, and/or that the second layer of a first layer system, in the region of its at least one beveled end, faces towards the first layer of a second layer system. In this context, the second layer of the first layer system can rest directly on the first layer of the second layer system. As an alternative, however, at least one further layer, such as for example an adhesive layer and/or a layer of thin nonwoven material or of fiber material impregnated with resin, can also be located between the second layer of the first layer system and the first layer of the second layer system.

Preferred aspects of the invention are based on the approach of manufacturing a rotor blade component, such as for example a rotor blade spar cap, from a plurality of layer systems, wherein preferably each layer system is in the form of a layered composite and comprises a first layer of a first material as well as a second layer of a second material. In this context, the second material has a smaller modulus of elasticity than the first material, so that the stiffness of the second layer is lower than the stiffness of the first layer, even if the two layers have the same thickness.

The layer systems can each be beveled at least at one end, so that in each case, at the at least one end, the second layer projects beyond the first layer. By beveling the layer system at the at least one end, which can also be referred to as scarfing the layer system, an end surface of the layer system, in particular an end surface of the first layer, is produced. In this context, the end surface is inclined with respect to a contact surface between the first and the second layer, in particular in such a way that the first layer ends in a wedge shape or that the thickness at the end of the first layer approaches zero. Thus, when several such layer systems are joined together, this results, in a preferred manner, in a stack of a pyramid type with a high load-bearing capacity since jumps in stiffness at the ends of the first layers can be avoided and the risk of detachment is reduced. Preferably, the layer systems are joined to one another in such a way that the second layers face towards the first layers of the respective layer system located underneath.

Since the stiffness of the layer system is reduced in the region of the second layer, jumps in stiffness between the individual layer systems or in the rotor blade component and thus the risk of the individual layer systems detaching from each other can be reduced. At the same time, the smaller stiffness of the second layer also has an effect on the possible bevel angle at which part of the layer system, in particular of the first layer, is removed, e.g. by milling, cutting, grinding or sawing. For example, the bevel angle can be chosen to be larger than for conventional layers of rotor blade components due to the second layer having a lower stiffness, as a result of which the cost of manufacturing the scarfs can be reduced. In addition, the ends of the individual layer systems can be closer together. It is conceivable, for example, to bevel the at least one end of the layer system in such a way that the at least one end has a pitch corresponding to the bevel angle of between 1:50 and 1:200, in particular substantially 1:80, relative to the contact surface between the first and the second layer.

A layer system can be formed, for example, from pultruded carbon fibers, which form the first layer, and a glass fiber scrim, which forms the second layer. When the at least one end of the layer system is beveled, in a preferred manner, at least one edge of the carbon fiber layer is then cut off so that the carbon fiber layer tapers towards the end, and in particular that it tapers to a point, or in a wedge shape, at the bevel angle. If applicable, at least one edge of the glass fiber scrim can also be cut off during the course of the beveling process so that the glass fiber scrim also tapers towards the end, as a result of which the stiffness of the second layer can be further reduced towards the end.

Overall, the manufacture of rotor blades is improved by means of the invention, and a corresponding wind energy installation is provided by the invention.

In a preferred embodiment, the layer system is manufactured by bonding the second layer of the second material to the first layer during the course of fabrication of the first layer of the first material. For example, the first layer can be fabricated on the second layer or at least partially around the second layer. It is conceivable, for example, that the first material is pultruded in a pultrusion process and, in the course of this, is preferably deposited on the second layer and/or around the second layer. In this way, the layer system can be produced in a particularly small number of production steps. In particular, this also allows a particularly strong bond between the first and the second layer to be produced.

In particular, the second layer can be incorporated into the first layer or into a partial layer of the first material during the course of the manufacture of the first layer from the first material. It is advantageous, for example, if the second material, e. g. in the form of a glass fiber scrim or a glass fiber bundle (rovings, as they are referred to), is already introduced as a second layer during the course of the production of the first layer. By means of this, the fiber bundles as well as fiber scrims can reliably bond with the first layer, whereby the contact surface between the fiber bundles or fiber scrims and the first layer may be uneven. In particular, an irregular transition, preferably a continuous transition, between the first and the second layer can thus result when the at least one end is beveled. This is particularly preferred, as the formation of a crack front and accordingly a detachment at high longitudinal loads can thus be delayed.

The introduction of fiber bundles has the advantage, in particular when compared with scrims, that the fiber bundles can also be introduced at the lateral edges of the first layer running along the longitudinal direction. In a particularly preferred manner, fiber bundles (rovings) are introduced, during the course of the manufacture of the first layer, in such a way that at least a portion of the first layer is laterally surrounded by the fiber bundles. If necessary, the fiber bundles which have been introduced can also enclose a fiber scrim. By means of this, it can be ensured that, in the region of the at least one beveled end, the elastic properties of the layer system are substantially determined by the second layer.

In a further preferred embodiment, the first layer is manufactured of the first material separately from the second layer being manufactured of the second material, wherein the layer system is manufactured by applying the second layer onto the first layer. In this way, it can be ensured in a particularly simple manner that the second layer, at least in the region of the at least one beveled end, extends completely along the first layer, in particular also along, or up to, its lateral edges, i.e. perpendicular to the longitudinal direction over the entire width of the first layer.

In a further embodiment, the second layer is bonded or applied only in a region of the at least one end of the first layer in which the layer system is beveled. As depicted in FIG. 4, wherein similar features have been similarly numbered. This makes it possible to save material and weight of the layer system or of the rotor blade component. In addition, by means of this, it is possible to vary the elastic properties of the rotor blade component in the longitudinal direction. section by section.

In a further preferred embodiment, the layer system is beveled at the at least one end with the aid of the at least one separation process in such a way that the end of the second layer which projects beyond the first layer has a substantially rectangular end face, in particular a substantially rectangular end face which extends perpendicular to the longitudinal direction, and/or that it has a finite layer thickness. In this context, the height of the lateral surface or the thickness of the second layer is, in a preferred manner, at least half as great as the average thickness of the second layer, in particular at least half as great as the thickness of the second layer outside the region of the at least one beveled end. For example, the layer system can be beveled in such a way that the side surface has a height of substantially 0.5 mm, or that the second layer has a thickness of substantially 0.5 mm at the beveled end. In this way, it can be avoided that the stiffness of the second layer in the region where it projects beyond the first layer is so low that it is damaged, for example, in the course of the at least one separation process and/or in the course of the joining of a plurality of layer systems.

In a further preferred embodiment, the at least one beveled end of the layer system is covered with a third layer made of a third material. Preferably, the third material has a modulus of elasticity, in particular in the longitudinal direction, that is greater than the modulus of elasticity of the second and/or of the first layer. As an alternative, however, the third material may also be the same as the first or the second material. By covering the at least one beveled end with the third layer, the peeling load on the at least one end is reduced, and also a further load path for the flow of force from the terminating layer system, is provided.

In a further preferred embodiment, the layer system is beveled in such a way that, in the region of the at least one beveled end, the layer system has an end face which is inclined with respect to a contact surface between the first and the second layer, and two side end faces which are opposite to one another, in particular side end faces which are connected via the end face, which side end faces run substantially perpendicular to the contact face between the first and the second layer and are inclined with respect to one another in such a way that, towards the end of the layer system, they taper towards each other. In other words, the layer system can be beveled in such a way that, in the region of the beveled end, it tapers in a point-like manner or forms a bisected truncated pyramid, wherein the two side end faces which are opposite to one another, together with the end face, form at least a portion of the lateral surface of the truncated pyramid. By means of this, it can be ensured that, in the region of the at least one beveled end, the elastic properties of the layer system are determined by the second layer, even if, outside the region of the beveled end, the second layer does not extend along, or up to, the lateral edges of the first layer, i.e. does not extend over the entire width of the first layer.

In a further preferred embodiment, the second layer has a smaller thickness than the first layer. By means of this, it is made possible for the load-bearing capacity of the layer system to be determined substantially by the first layer. In particular, it can be achieved in this way that the load-bearing capacity of the rotor blade component is substantially comparable to the load-bearing capacity of conventional rotor blade components.

In a further preferred embodiment, the first layer has a thickness of between 1 mm and 10 mm, preferably between 2 mm and 5 mm. In addition or as an alternative, the second layer has a thickness of between 0.1 mm and 1 mm, preferably between 0.2 mm and 0.5 mm. By means of this, a sufficient load-bearing capacity of the layer system or of the rotor blade component can be ensured while at the same time reducing the risk of the layers detaching from each other. In particular, in this way, an optimum ratio between the layer thicknesses of the first and the second layer can be achieved in which the load-bearing capacity is highest, with the risk of detachment being reduced.

In a further preferred embodiment, the first material has a modulus of elasticity in the longitudinal direction of between $5\times10^4$ N/mm$^2$ and $50\times10^4$ N/mm$^2$, preferably between $10\times10^4$ N/mm$^2$ and $30\times10^4$ N/mm$^2$. In addition or as an alternative, the second material has a modulus of elasticity in the longitudinal direction of between $1\times10^4$ N/mm$^2$ and $6\times10^4$ N/mm$^2$, preferably between $4\times10^4$ N/mm$^2$ and $5\times10^4$ N/mm$^2$. The first material or the first layer may for example comprise carbon fibers and may in particular be constructed in the form of a woven fabric or a scrim fabric. The second material or the second layer may for example comprise glass fibers and may in particular be constructed in the form of a woven fabric or a scrim fabric. It is also conceivable for the first and/or the second material to comprise fiber bundles (rovings, as they are referred to), and for the first and/or the second layer to contain at least one such fiber bundle, and in particular for the first and/or the second layer to be formed from one or more such fiber bundles.

In a further preferred embodiment, the first material and the second material comprises fibers, wherein the proportion of fibers which extend substantially along the longitudinal direction is smaller in the second material than in the first material. In this context, the first material may otherwise correspond to the second material, i.e. the first material may be the same as the second material. For example, the first material or the first layer may comprise a carbon fiber fabric in which the carbon fibers extend substantially along the longitudinal direction. The second material or the second layer may also comprise a carbon fiber fabric, in which, however, the carbon fibers extend at an angle to the longitudinal direction, for example at 45° or even at 90°, or perpendicular, to the longitudinal direction. In this way, a reliable reduction of the modulus of elasticity in the longitudinal direction can be achieved at the transition from the first layer to the second layer.

Further advantages, features and possible applications of the present invention will be apparent from the following description in connection with the figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 1A illustrates an end of a layer system similar to FIG. 1 for an alternative embodiment in accordance with the present disclosure;

DETAILED DESCRIPTION

Figure 1:
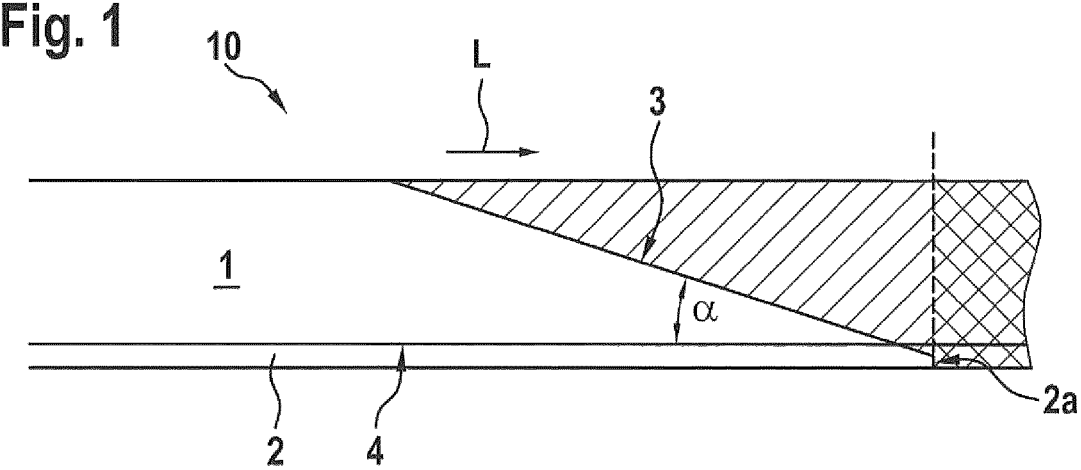
FIG. 1 shows a side view of an example of an end of a layer system made up of a first layer and a second layer.

FIG. 1 shows a side view of an example of an end of a layer system 10 made up of a first layer 1 of a first material, e. g. carbon fibers, and a second layer 2 of a second material, e. g. glass fibers. In this context, the second layer 2 has a lower modulus of elasticity in a longitudinal direction L than the first layer 1. In addition, the second layer is formed to be significantly thinner, in particular substantially by a factor of 10, than the first layer.

The layer system 10 has a beveled end with an end surface 3 that is inclined at a bevel angle α with respect to a contact surface 4 between the first layer and the second layer 1, 2. In this context, the end surface 4 extends over the entire thickness of the first layer 1 and at least a portion of the second layer 2, so that, in the side view shown, the first layer 1 tapers to a point at the bevel angle α, while the second layer 2 has a blunt end, i. e. an end with an end surface 2a which is oriented so as to be perpendicular to the contact surface 4. In this context, the second layer 2 projects beyond the first layer 1. At the outermost end, the thickness of the layer system 10 is smaller than the thickness of the second layer 2 outside the beveled region, in particular substantially half as large.

Such a geometry of the end of the layer system 10 can be achieved, for example, by a portion of the first and second materials being removed by at least one separation process. In the present FIG. 1, the material removed, or the material to be removed, is indicated by the hatching.

For example, the layer system 10 can be sawn through perpendicular to the contact surface 4, for example along the dashed line shown in FIG. 1, so that the end of the layer system 10 is formed. Subsequently, the end surface 3 can be produced, for example by milling. As an alternative, of course, in the reverse order to this, the end surface 3 could also be produced, by milling, at an already existing end of the layer system 10, and then the tip of the second layer 2 produced in this process could be sawn off.

Figure 2:
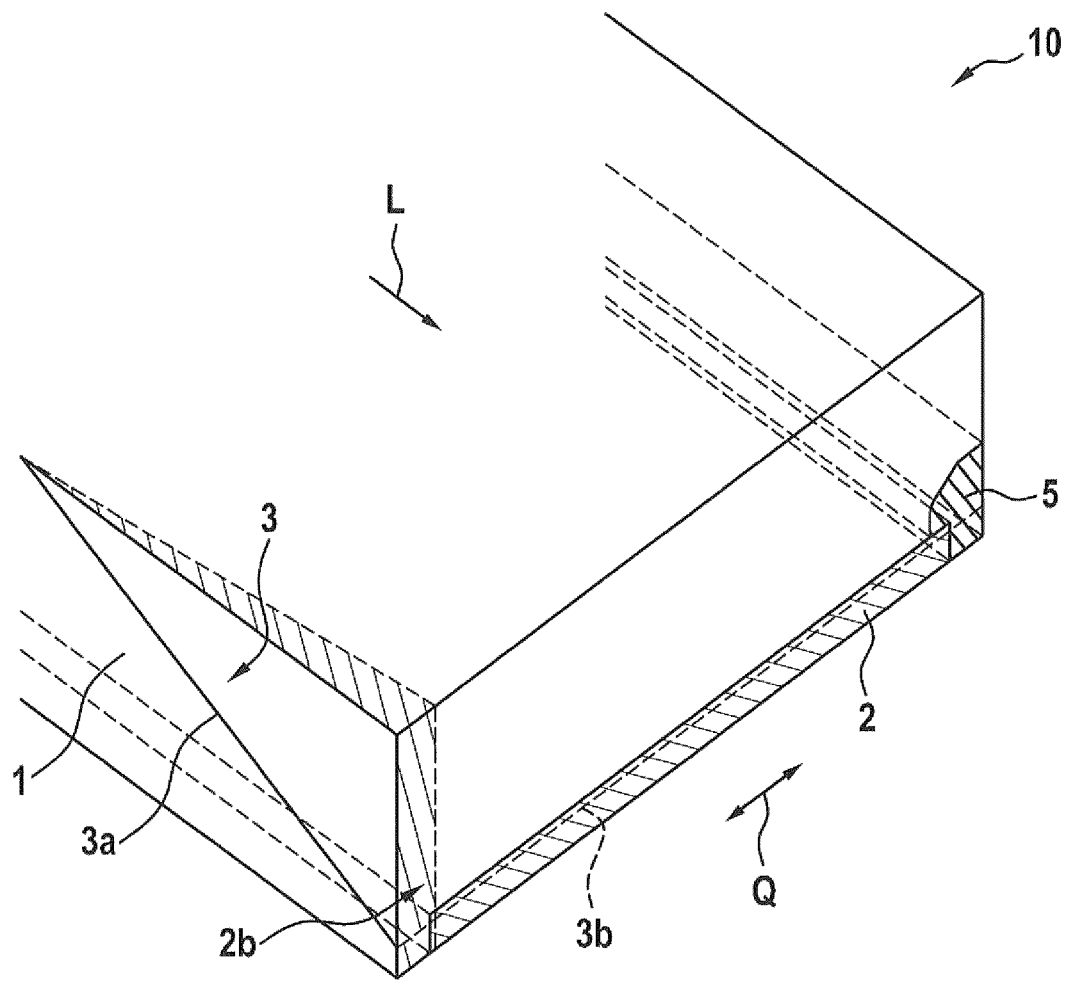
FIG. 2 shows a three-dimensional representation of an example of an end of a layer system made up of a first layer and a second layer.

FIG. 2 shows a three-dimensional representation of a second example of an end of a layer system 10 made up of a first layer 1 of a first material and a second layer 2 of a second material. In this context, the end of the layer system 10 is beveled in such a way that it has an end surface 3 which is inclined with respect to a contact surface between the first and the second layer 1, 2 (see FIG. 1). By means of this, an end of the first layer 1 is formed, which end of the first layer 1 is tapered in a wedge-shaped manner. The boundary of the end surface 3 is indicated in FIG. 2 by the lines 3a and 3b.

The layer system 10 is preferably manufactured by means of a pultrusion process, so that the first layer 1 consists of carbon fibers which are arranged along a longitudinal direction L. As part of the pultrusion process, the second layer 2, for example a glass fiber scrim or a carbon fiber scrim or woven fabric, in particular with fibers which are arranged at an angle with respect to the longitudinal direction L, can be incorporated. In particular, it is conceivable, during the course of the pultrusion of the first material, to also introduce the second material, so that the second layer 2 is laterally surrounded by the first layer 1, i. e. in a transverse direction Q transverse to the longitudinal direction L.

In order to ensure that this surrounding material does not affect the elastic properties of the layer system 10 in the region of the end in which the layer system 10 is beveled, the layer system 10 can also be beveled laterally, for example by a wedge-shaped portion at the lateral edge of the layer system 10 being cut off. By means of this, in the region of the end of the layer system 10, the second layer 2 is able to extend in a continuous manner in the transverse direction Q from one side of the layer system 10 to the opposite side. This case is shown in FIG. 2 on the left side of the layer system 10 which faces towards the viewer. In the case of the lateral beveling, a side end face 2b is created so that, at least in the region in which the second layer 2 projects beyond the first layer 1 (see FIG. 1), the elastic properties of the layer system 10 are substantially determined by the elastic properties of the second layer 2 in this region.

As an alternative, it is also possible to ensure already during the course of the pultrusion of the layer system 10 that the second layer 2 extends continuously from one side of the layer system 10 to the opposite side along the transverse direction Q, for example by the second material being inserted in the form of a fiber bundle (roving, as it is referred to) at the lateral ends during the course of the pultrusion of the first material. By means of this, elongated regions 5 of low stiffness, in particular strip-shaped elongated regions 5 of low stiffness, are formed, which extend laterally with respect to the second layer 2 along the longitudinal direction L, and which laterally surround the second layer 2. This case is shown in FIG. 2 on the right side of the layer system 10 which faces away from the viewer.

Figure 3:
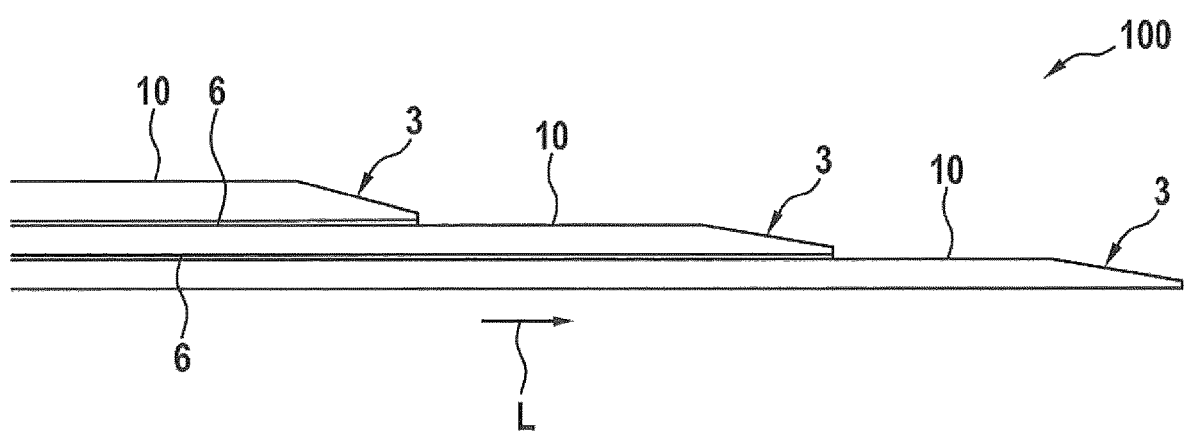
FIG. 3 shows a side view of an example of an end of a rotor blade spar cap.

FIG. 3 shows a side view of a rotor blade spar cap 100 which is formed from three layer systems 10 stacked on top of each other. In this context, the layer systems 10 are arranged in such a way that, in each case, a second layer of a layer system 10 made of a second material faces towards a first layer of an adjacent layer system 10 made of a first material. The layer systems 10 are bonded to one another via adhesive layers 6 located between the layer systems 10.

The layer systems 10 have beveled ends that are arranged in a staggered manner along a longitudinal direction L of the layer systems 10. This results in a pyramid-shaped structure of the rotor blade spar cap 100. In this context, end surfaces 3 created by beveling the ends can be oriented in such a way that the layer systems 10 form steps which are flattened towards the end of the rotor blade spar cap 100.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method of manufacturing a rotor blade component for a rotor blade of a wind energy installation, the method comprising:
   manufacturing a layer system comprising a first layer of a first material and a second layer of a second material;
   wherein the second layer extends at least partially along a longitudinal direction of the first layer and the second material has a lower modulus of elasticity in the longitudinal direction than the first material,
   beveling the first and second layers at at least at one end of the layer system with the aid of at least one separation process such that the beveled end of the first layer and the beveled end of the second layer together form a continuous beveled end surface, and such that the second layer projects beyond the first layer at the at least one end of the layer system; and
   connecting the layer system to at least one further layer system to form the rotor blade component;
   wherein manufacturing the layer system comprises incorporating the second material into a partial layer of the first material during the course of the manufacture of the first layer from the first material, thereby forming the second layer and wherein incorporating the second material into a partial layer of the first material comprises incorporating the second layer only in a region of the at least one end of the first layer in which the layer system is beveled.

2. The method of claim 1, wherein the manufactured rotor blade component is a rotor blade spar cap.

3. The method of claim 1, further comprising manufacturing a wind energy installation using the rotor blade component.

4. The method of claim 1, wherein manufacturing the layer system comprises:
   manufacturing the first layer from the first material separately from manufacturing the second layer from the second material; and
   applying the second layer onto the first layer.

5. The method of claim 4, wherein applying the second layer onto the first layer comprises applying the second layer only in a region of the at least one end of the first layer in which the layer system is beveled.

6. The method of claim 1, wherein beveling at least at one end of the layer system comprises beveling the layer system such that the end of the second layer that projects beyond the first layer has at least one of a substantially rectangular end face or a finite layer thickness.

7. The method of claim 1, further comprising:
covering the at least one beveled end of the layer system with a third layer that comprises a third material.

8. The method of claim 1, wherein beveling at least at one end of the layer system comprises beveling the layer system such that:
in the region of the at least one beveled end, an end face of the layer system is inclined with respect to a contact surface between the first and the second layer; and
in the region of the at least one beveled end, the layer system has two side end faces that are opposite to one another, and which run substantially perpendicular to the contact surface between the first and the second layer, and which are inclined with respect to one another in such a way that the two side end faces taper toward the end of the layer system.

9. A rotor blade component for a rotor blade of a wind energy installation, the rotor blade component comprising:
at least one first layer system comprising a first layer of a first material and a second layer of a second material;
wherein the second layer is at least partially applied to the first layer along a longitudinal direction;
wherein the second material has a lower modulus of elasticity in the longitudinal direction than the first material;
wherein each of the first and second layers of the layer system is beveled at least at one end such that the beveled end of the first layer and the beveled end of the second layer together form a continuous beveled end surface, and such that the second layer projects beyond the first layer at the at least one end of the layer system;
wherein the second layer is incorporated only in a region of the at least one end of the first layer in which the layer system is beveled; and
at least one second layer system connected to the at least one first layer system to form the rotor blade component.

10. The rotor blade component of claim 9, wherein the rotor blade component is a rotor blade spar cap.

11. The rotor blade component of claim 9, wherein the second layer has a smaller thickness than the first layer.

12. The rotor blade component of claim 9, wherein at least one of:
the first layer has a thickness of between 1 mm and 10 mm, inclusive; or
the second layer has a thickness of between 0.1 mm and 1 mm, inclusive.

13. The rotor blade component of claim 12, wherein at least one of:
the first layer has a thickness of between 2 mm and 5 mm, inclusive; or
the second layer has a thickness of between 0.2 mm and 0.5 mm, inclusive.

14. The rotor blade component of claim 9, wherein at least one of:
the first material has a modulus of elasticity in the longitudinal direction of between $5\times10^4$ N/mm$^2$ and $50\times10^4$ N/mm$^2$, inclusive; or
the second material has a modulus of elasticity in the longitudinal direction of between $1\times10^4$ N/mm$^2$ and $6\times10^4$ N/mm$^2$, inclusive.

15. The rotor blade component of claim 14, wherein at least one of:
the first material has a modulus of elasticity in the longitudinal direction of between $10\times10^4$ N/mm$^2$ and $30\times10^4$ N/mm$^2$, inclusive; or
the second material has a modulus of elasticity in the longitudinal direction of between $4\times10^4$ N/mm$^2$ and $5\times10^4$ N/mm$^2$, inclusive.

16. The rotor blade component of claim 9, wherein:
the first material and the second material comprise fibers; and
wherein the proportion of fibers that extend along the longitudinal direction is smaller in the second material than in the first material.

17. A wind energy installation, comprising:
at least one rotor blade comprising a rotor blade component;
the rotor blade component comprising:
at least one first layer system comprising a first layer of a first material and a second layer of a second material,
wherein the second layer is at least partially applied to the first layer along a longitudinal direction,
wherein the second material has a lower modulus of elasticity in the longitudinal direction than the first material,
wherein each of the first and second layers of the layer system is beveled at least at one end such that the beveled end of the first layer and the beveled end of the second layer together form a continuous beveled end surface, and such that the second layer projects beyond the first layer at the at least one end of the layer system,
wherein the second layer is incorporated only in a region of the at least one end of the first layer in which the layer system is beveled, and
at least one second layer system connected to the at least one first layer system to form the rotor blade component.

* * * * *